United States Patent [19]

Marshall

[11] Patent Number: 4,822,240
[45] Date of Patent: Apr. 18, 1989

[54] COMPRESSOR THRUST BALANCER

[75] Inventor: Dale F. Marshall, Ashburnham, Mass.

[73] Assignee: General Electric Company, Schenectady, N.Y.

[21] Appl. No.: 167,080

[22] Filed: Mar. 11, 1988

[51] Int. Cl.$^4$ .............................................. F01D 3/04
[52] U.S. Cl. .................................... 415/105; 277/27; 277/173
[58] Field of Search ............... 415/104, 105, 106, 107, 415/110, 111, 112; 277/27, 173, 177, 70, 71, 72 R, 72 FM, 73, 79

[56] References Cited

U.S. PATENT DOCUMENTS

| | | | |
|---|---|---|---|
| 3,506,375 | 4/1970 | Endress | 415/105 |
| 4,309,144 | 1/1982 | Eggmann et al. | 415/105 |
| 4,413,946 | 11/1983 | Marshall | 415/28 |

FOREIGN PATENT DOCUMENTS

| | | | |
|---|---|---|---|
| 220099 | 3/1985 | Fed. Rep. of Germany | 415/104 |
| 1325201 | 7/1987 | U.S.S.R. | 415/104 |
| 374739 | 6/1982 | United Kingdom | 415/104 |

Primary Examiner—Robert E. Garrett
Assistant Examiner—John T. Kwon
Attorney, Agent, or Firm—Jerome C. Squillaro

[57] ABSTRACT

A compressor includes a rotor which is subject on the inlet side to high pressure process fluid whereas the other end of the rotor is subject to atmospheric pressure. This creates a force unbalance in the axial direction for which thrust bearings are designed under dynamic operating conditions. At start-up and shutdown, periods of low speed operation, force unbalance is particularly acute since the normal impeller high speed reactive forces are not present. This invention utilizes available high pressure seal fluid during periods of low speed operation to provide a closed operating chamber which will provide a static reactive force opposing the process fluid force. Under normal operating conditions, lubricating oil is then sent to the thrust bearing as the high pressure seal fluid is relieved.

12 Claims, 2 Drawing Sheets

COMPRESSOR THRUST BALANCER

This invention relates, in general, to compressor machinery; and, in particular, to a device and method for avoiding excessive thrust on the compressor thrust bearing during periods of low speed compressor operation.

BACKGROUND OF THE INVENTION

A single stage compressor with an overhung rotor for process gas having one end of the compressor rotor exposed to atmospheric pressure and the other rotor end exposed to suction pressure can incur an extremely large unbalanced load on the thrust area of the rotor as a result of the imposed pressure differential between atmosphere and suction pressures. At low operating speeds, such as at startup or shutdown, the imposed loading is known to exceed the load factor for which the thrust bearing was selected. For that reason, it has been necessary to improvise in order to allow low speed operation when excess thrust load is being incurred.

A conventional approach toward resolving the foregoing has been to increase the load capacity of the thrust bearing sufficient to withstand the load level which the bearing incurs. This approach is disadvantageous because the larger bearing requires higher oil flow and has higher power losses at design speed. Another approach has been to reduce the pressure differential by venting the process gas from the compressor to reduce the overall internal pressure to an acceptable level. This approach has been likewise unsatisfactory in that it will result in a considerable waste of process gas during compressor operation. Still another technique has been to counteract the high pressure differential with appropriately directed high pressure oil at a pressure which may be significantly higher than the process gas. This approach, in the past, has tended to complicate and enlarge the seal oil system.

It is an object of the present invention to provide a thrust balancing system for a compressor which will be effective to avoid excessive thrust loadings during periods of low rotor speed.

It is another object of the invention to accomplish the foregoing object without increasing thrust bearing size, or causing increased thrust bearing design complexity. Further it is an object of the invention to avoid increasing oil pressures or having to vent process gas.

It is yet a further object of the invention to utilize high pressure seal fluid during periods of low speed operation and also to utilize lower pressure lubrication fluid during periods of normal compressor operation within the thrust bearing housing.

SUMMARY OF THE INVENTION

In the preferred embodiment, the invention is practiced in a single stage compressor having an overhung rotor wherein one end of the compressor rotor incorporating the impeller, which is "overhung", is outside one of the journal bearings and is exposed to process gas whereas the other end of the compressor rotor is exposed to atmospheric pressure. The compressor casing may include a thrust bearing housing which encloses a thrust collar rotatable with the compressor rotor and a stationary thrust bearing ring axially adjacent the thrust collar and having a common centerline axis. An axially slidable annular sealing ring is disposed on an outboard side of the thrust collar between the inner circumference of the thrust bearing housing and the outer circumference of the thrust bearing ring. A pilot oil feed cavity is connected to move the axially slidable sealing ring toward the thrust collar and in sealing engagement therewith. Main oil pressure is introduced on the outboard side of the thrust collar so that during periods of compressor low speed conditions, the thrust unbalance caused by the process pressure on the inlet side of the compressor is relieved by the main oil pressure against the outboard side of the thrust collar.

Still as another aspect of the invention, the sliding seal is formed on its bearing contact surface with hydrodynamic pockets whereby as the speed of the thrust collar is increased, the axial distance between the sealing ring and the thrust collar is increased to provide for thrust bearing cooling while simultaneously maintaining a seal in the thrust collar area. Once the operating speed is high enough so that the thrust capacity of the thrust bearing ring is adequate to carry the thrust, pilot oil pressure behind the sliding seal is relieved as well as the main oil pressure on the outboard surface of the thrust collar. This will allow the sealing ring to further depart from the thrust collar. When the compressor speed again slows for shutdown the aforedescribed invention is once again actuated using the pilot oil pressure. During low speed operation, high pressure seal oil is introduced into the thrust bearing housing whereas during normal operation lube oil is sent to the thrust bearing.

DETAILED DESCRIPTION OF THE INVENTION

Figure 1:
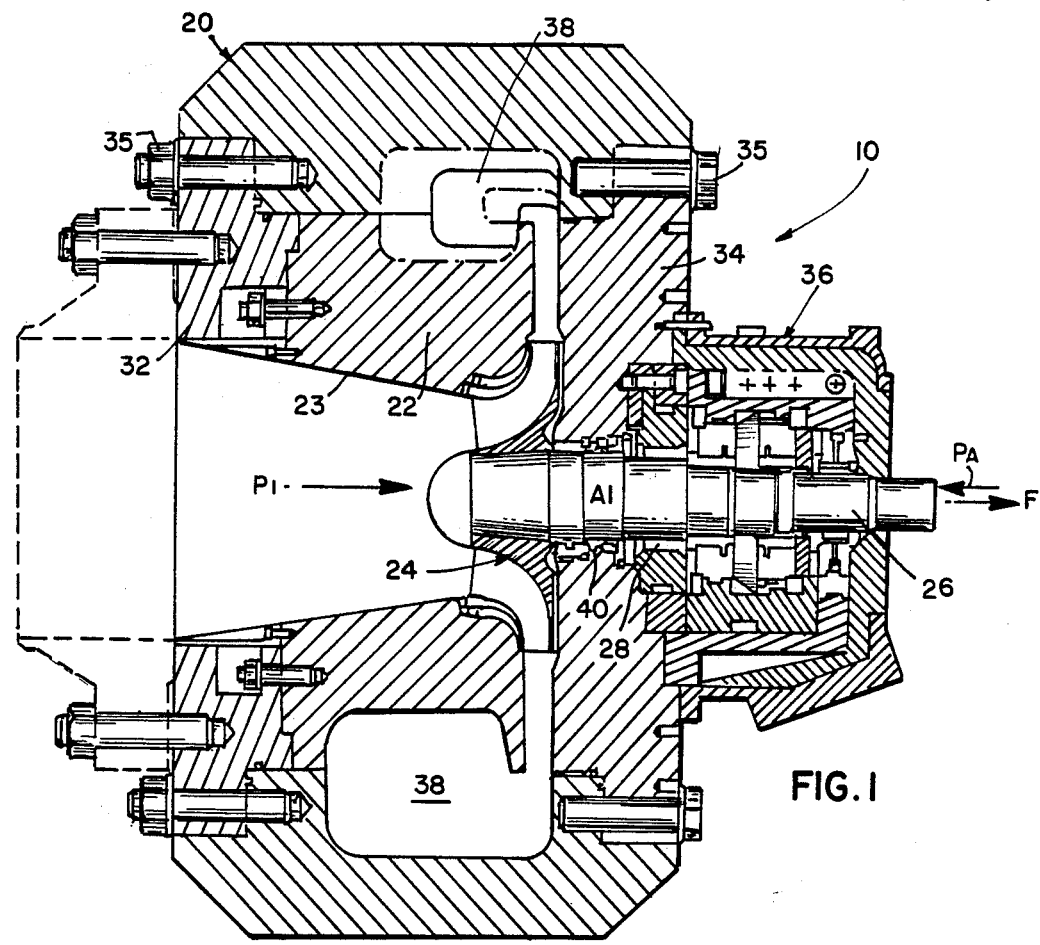
FIG. 1 is a cross-section of a single stage, overhung rotor compressor.

Referring now to FIG. 1, a compressor 10 includes a compressor casing 20 which surrounds a head 22 having a truncated cone bore 23 for inlet process fluid. As depicted in FIG. 1, process fluid flows from left to right, from the inlet end of the compressor to an impeller 24. The impeller is attached to and rotatable with a rotor 26 which is supported within the compressor casing by journal bearings one, of which, is shown as main journal bearing 28. As shown in FIG. 1, where there are two similar parts, the one to the left will be referred to as the inboard part and the one to the right will be referred to as the outboard part. Hence, the compressor casing is closed at the left side by an inboard end cover 32 and closed at the right side by an outboard end cover 34 each of which is fastened to the compressor casing 20 by bolts 35. The compressor rotor is supported by bearings which are part of a bearing housing 36 which will be described in further detail, yet to come.

The operation of the compressor thus far described is as follows. A prime mover (not shown) such as a turbine or electric motor drive causes the rotor 26 to rotate. The inlet side of the compressor, such as the bore side of the head 22, is subjected to process fluid at high pressure P1. The rotor causes its attached impeller 24 also to rotate so that the pressure of the process fluid is caused to rise as the fluid is centrifugally compressed to an outer annulus 38 of the compressor casing whereupon the fluid is discharged from the compressor casing from a discharge opening which is not shown but is otherwise familiar to persons having skill in the art. The outboard rotor end opposite the inboard rotor end on the inlet side of the compressor casing is exposed to atmospheric pressure PA. Atmospheric pressure is considerably less than process pressure P1 so that the rotor is subjected to a net force F, at static and low speed conditions in the outboard direction, which is approximately equal to the difference between the process pressure less atmospheric pressure times the area A1 under the main shaft seal 40. This is a static pressure difference which is not accounted for until the compressor attains a sufficient speed to provide a reactive force to the force F due to the process fluid pressure differential acting against the unbalanced area of the impeller. In the bearing housing 36, the force F acting on the rotor is transferred to the compressor casing through the thrust bearing now to be described.

A bearing housing 36 may include an outer bearing housing 46 and an inner bearing housing 48 generally all referred to as the bearing housing 36. The bearing housing is fastened to the compressor casing by means of radially inner bolts 50 and radially outer bolts 52. The rotor 26 is supported within the bearing housing by means of a main journal bearing 28 and an outboard journal bearing 54. The thrust bearing structure is mounted in the inner bearing housing 48 between the two journal bearings, and includes a rotatable thrust collar and runner 60 affixed to or formed with the rotor 26. The stationary portion of the thrust bearing is a pair of thrust bearing rings. It is well known by those acquainted with the art that a thrust bearing ring is an annular cage having a radially inner support ring and a radially outer support ring connected by a radially extending member which supports a plurality of hydrodynamically pie shaped segments or bearing pads. There are two thrust bearing rings, in the present embodiment, as further represented by inboard bearing ring 62 and outboard bearing ring 64. As unequal forces are applied to the rotor ends, the inboard and outboard bearing pads transfer the unequal force to their respective bearing ring (depending on the direction of the unequal force) which is then transferred to the thrust bearing housing and the compressor casing.

Figure 3:
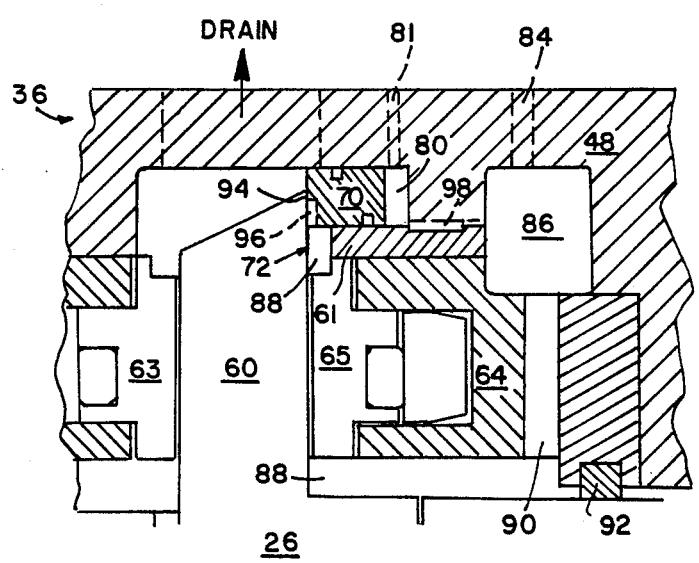
FIG. 3 is a cross-section schematic of the thrust bearing housing portion of the compressor casing.
Figure 2:
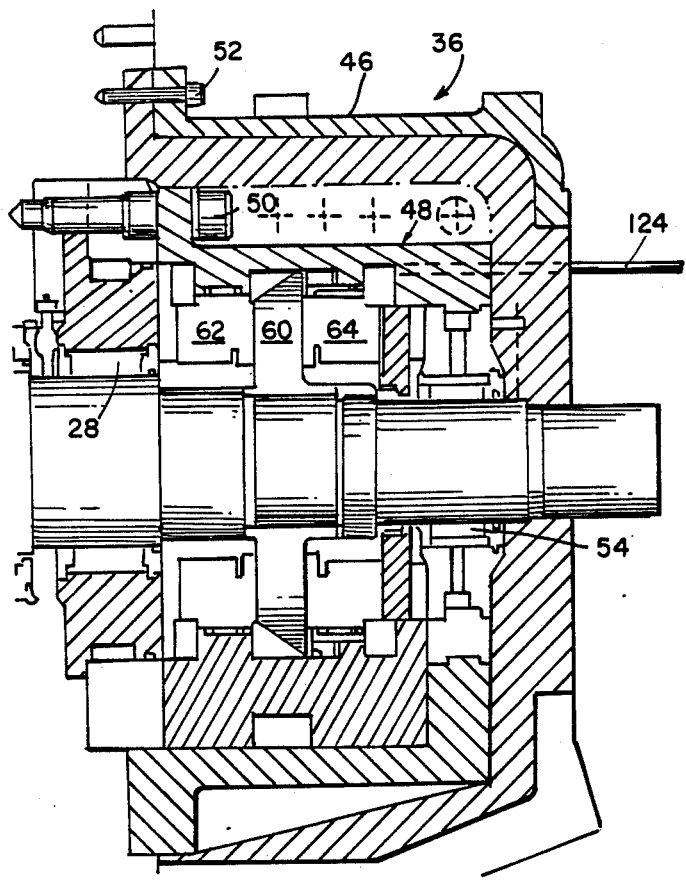
FIG. 2 is a cross-section of the bearing housing portion of the compressor casing.

FIG. 3 is an enlarged schematic of the bearing housing 36 which may include the inner housing 48. The thrust collar or thrust runner 60 is disposed axially between the inboard bearing ring 62 and the outboard bearing pad 65. The bearing pad 65 is only one of a plurality of bearing pads (not shown) which are contained within a bearing cage or ring 64. An outer support ring 61 locates the outboard thrust bearing ring 64 relative to the inner housing 48. An axially slidable annular sealing ring 70 is shown in its sealing position sealingly engaging the outboard surface 72 of the thrust collar 60. The sealing ring is positioned between the radially outer circumference of the support ring 61 and the radially inner circumference of the inner bearing housing 48. The sealing ring is caused to move in the axial direction toward the thrust collar by means of a pilot oil pressure which is introduced into an annular pilot cavity 80 through port 81 which applies pressure to the outboard side of the sliding seal causing the sealing ring to sealingly engage the outboard side 72 of the thrust collar. The means for introducing pilot fluid pressure into the cavity 80 will be shown in conjunction with the description of FIG. 4.

Main oil feed 84 provides oil to main oil manifold 86 which, in turn, provides oil into the interior thrust bearing housing 88 through radial passageways 90 (only one shown). A thrust housing oil seal 92, along with the annular sliding seal 70, retains pressurized oil within the interior of the bearing housing, which provides a counterforce acting against the outboard surface 72 of the thrust collar to oppose the unbalanced axial force acting on the rotor due to process fluid pressure.

The axially moveable sealing ring 70 is unbalanced so that even after equal oil pressure exists in the bearing area 88 and the annular cavity 80, a net force exists on the outboard side of the seal 70 to push the sealing ring into contact with the thrust collar 60. This means that under static conditions, there is essentially no leakage flow at the sealing surface 94. The inboard surface of the sealing ring at the sealing surface 94 must act as a secondary thrust bearing during startup conditions, effectively carrying the unbalanced load of the sealing ring. The inboard surface of the sealing ring 70 is machined in a thrust bearing configuration so as to form, under pressure, a hydrodynamic pocket 96, which might take the form of a tapered land or step bearing. As the operating speed of the rotor increases, there is an increase of oil film in the region of the hydrodynamic pocket 96 which effectively increases the axial clearance between the sealing ring and the thrust collar thereby increasing the oil flow. By properly balancing the area of the hydrodynamic pocket relative to the outboard seal area, the sealing ring will provide oil flow to adequately cool the thrust bearing during periods of low speed operation, while simultaneously maintaining a seal at the thrust collar to allow the static thrust to be counteracted by the main oil pressure in the bearing housing on the outboard side of the thrust collar. Once the operating speed of the rotor is high enough so that the thrust capacity of the thrust bearing is adequate to carry the thrust, the pilot oil feed pressure in cavity 80 is relieved and then immediately thereafter the main high pressure oil supply to the oil manifold 86 and outboard cavity 88 relative to the thrust collar is closed. This will cause the unbalance force on the sealing ring to reverse, moving the sealing ring 70 away from the thrust collar. Then when the thrust bearing pressure is at its normal operating level, the pumping action of the collar itself will keep pressure at the sealing ring area above the pilot oil inlet pressure. The annular cavity 80 is maintained at inlet pressure by passageways 98 connecting it with main oil manifold 86.

During a shutdown, a similar procedure occurs. When the speed of the rotor decreases below a predetermined level, the annular pilot cavity is provided with pressurized seal oil a fraction of a second before it is fed to the main oil manifold 86. The result is that the axially slidable annular sealing ring 70 seals against the thrust collar after which the thrust housing cavity 88 is pressurized to counteract rotor thrust as rotor speed decreases further. The condition is held until the rotor comes to rest.

Figure 4:
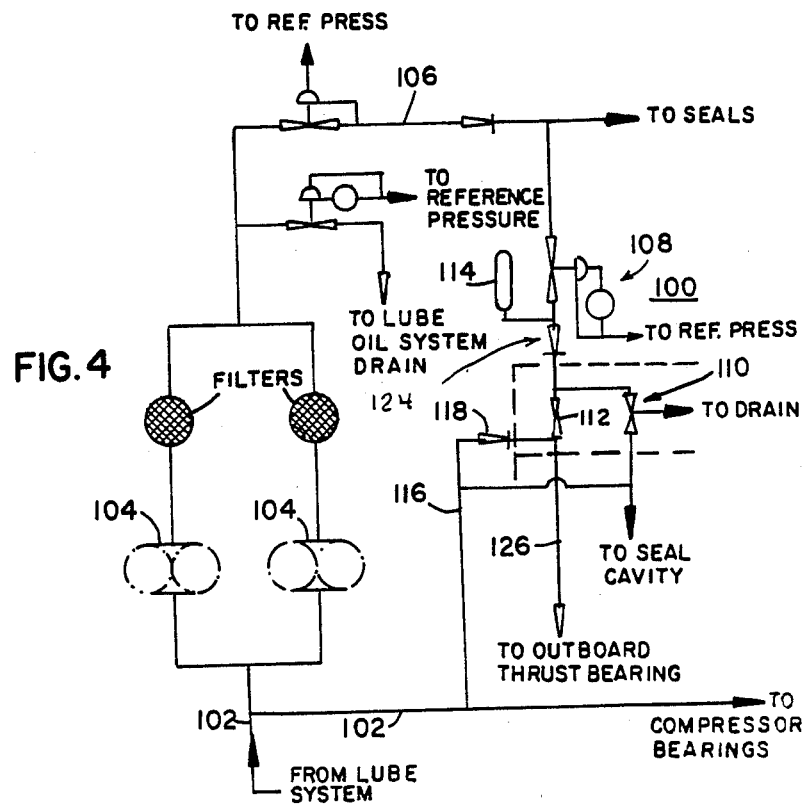
FIG. 4 is a schematic of the oil delivery system.

The area available on the outboard side of the thrust collar is typically two to three times the area under the process fluid seal. Therefore, the thrust compensation can be accomplished with oil at a pressure below the sealing pressure, so seal oil can be used as is shown in FIG. 4.

Another aspect of the present invention is that an oil supply system is provided which will provide for thrust balancing at low compressor speeds and also adequate lubrication at all compressor speeds. The oil supply system 100 is shown in FIG. 4 and includes a lubrication oil supply 102 which supplies oil to all compressor bearings other than the outboard thrust bearing under discussion with respect to the present invention. A portion of the compressor lubrication oil is passed through redundant pumps 104 and is discharged at high pressure into line 106 for pressurizing oil seals within the compressor in accordance with normal compressor sealing practice. According to the present invention seal oil is used to provide pilot fluid for moving axially slidable sealing ring 70 to seal the interior thrust bearing housing and to provide main oil pressure to provide a thrust balancing function during periods of low rotor speed.

Regulating valve 108 passes high pressure oil at a regulated pressure relative to sealing gas reference pressure into the high pressure oil feed line 124. The oil feed of high pressure oil is divided between a pilot oil valve 110 and a main oil valve 112. The pilot oil valve controls fluid flow into the pilot oil cavity 80 through port 81 previously described in FIG. 3, whereas the main oil valve 112 controls fluid flow into the main oil manifold 86 through the main oil feed 84 previously described with respect to FIG. 3. In practice and in accordance with the present invention, the valves are operated sequentially so that the pilot oil valve 110 is operated first and then followed by opening of the main oil valve 112.

An accumulator 114 is used in combination with the pressure regulating valve to assure that there is adequate pressure in the line 124 to meet the demands of the thrust balancing system as previously described. In addition, a line 116 connects the lube oil line 102 with the main oil feed line 126 to assure outboard thrust bearing lubrication during normal operating periods where high pressure seal oil is not required. A check valve 118 is used to provide flow from the line 102 automatically during periods at normal operating speeds when thrust unbalance is within the normal operating capabilities of the thrust bearing or under conditions where the process fluid pressure is low and therefore thrust unbalance is not so severe.

The invention as previously described operates in accordance with the following method. During periods of low speed rotor operation, introducing high pressure seal oil into an annular pilot oil cavity for moving the annular axially slidable sealing ring into sealing engagement with the thrust collar; introducing high pressure seal oil into a main oil manifold for applying seal oil pressure to the thrust collar in a closed thrust housing chamber. As the rotor gains speed, moving the sealing ring and the thrust collar axially apart using hydrodynamic forces whereby lubrication of the thrust bearing is accomplished. At normal operating speed, deleting high pressure seal oil for lower pressure lubricating oil whereby the thrust bearing operates under normal operating oil pressures. Reintroducing seal oil pressure into the bearing housing as previously described as the rotor speed decreases below a set limit.

Thus in accordance with the previously described construction and method of operation it is apparent that the present invention provides the following advantages.

The invention provides a thrust balancing system which operates during periods of low rotor speed to cause high pressure seal oil to be introduced into the thrust bearing housing for the combined purpose of first providing a closed chamber on the outboard side of the thrust collar; and second to allow the introduction of high pressure seal oil to provide a counterbalancing pressure against the thrust collar to offset process pressure during periods of low rotor speed.

In addition, as the rotor continues to increase speed, the sealing ring will move away from the thrust collar because of the unique hydrodynamic pockets formed in the inboard face of the axially slidable sealing ring to increase the lubrication of the thrust bearing.

After normal rotor speed has been attained, the high pressure seal oil is shut off and lubrication oil is introduced into the thrust bearing so that the bearing now operates as a conventional thrust bearing.

While there has been shown what is considered to be a preferred embodiment of the invention other modifications will occur to those having skill in the art. It is intended to claim all such modification as fall within the true spirit and scope of the appended claims.

What is claimed is:

1. A system for balancing thrust in a compressor including a compressor casing having a rotor supported therein; an impeller mounted on one end of the rotor and rotatable therewith; a thrust collar mounted on the rotor and rotatable with the rotor and at least one stationary thrust bearing ring axially adjacent the thrust collar for limiting the axial movement of the rotor; and wherein the thrust balancing system comprises:
 a bearing housing surrounding the thrust collar and the thrust bearing ring;
 an axially slidable sealing ring disposed within one side of the bearing housing and around the outer circumference of the thrust bearing ring;
 means for moving the axially slidable sealing ring into sealing contact with the thrust collar during periods of low compressor rotor speed; and,
 means for pressurizing the bearing housing on the side including the axially slidable sealing ring.

2. The thrust balancing system recited in claim 1 wherein the axially slidable sealing ring further includes hydrodynamic pockets on the surface of the sealing ring facing the thrust bearing collar.

3. The thrust balancing system recited in claim 1 further including an annular pilot oil cavity between the thrust bearing ring outer circumference and the inner surface of the bearing housing; the axially slidable sealing ring disposed between the pilot oil cavity and the thrust collar.

4. The thrust balancing system recited in claim 1 further including an annular pilot oil cavity between the thrust bearing ring outer circumference and the inner surface of the bearing housing; and, a main oil manifold having a discharge outlet radially inwardly of the thrust bearing ring outer circumference.

5. The thrust balancing system recited in claim 4 further comprising an oil delivery system including a first line connected to the pilot oil cavity and a second line connected to the main oil manifold; and, a third line having a check valve connected to the second line, the first and second lines being connected to high pressure oil and the third line being connected to a lower pressure oil whereby low pressure oil is delivered to the main oil manifold whenever the pressure in the second line falls below the pressure in the third line.

6. The thrust balancing system recited in claim 5 further including a pilot oil valve connected in the first line; a main oil valve connected in the second line; the pilot oil valve and the main oil valve being connected to a common high pressure oil header, whereby the valves must be operated sequentially to deliver pilot oil to the annular sealing ring prior to main oil being delivered to the thrust collar.

7. An improved compressor, including a compressor casing, having a rotor supported therein; an impeller mounted on one end of the rotor and rotable with the rotor; a thrust collar mounted on the rotor and rotatable with the rotor and at least one stationary thrust bearing ring mounted within a bearing housing for limiting the axial movement of the rotor under load; wherein the improvement comprises:

an axially slidable annular sealing ring disposed on an outboard side of the thrust collar between the inner circumference of the bearing housing and the outer circumference of the thrust bearing ring;

a pilot oil feed line connected to move the axially slidable sealing ring toward the thrust collar under conditions of low compressor speed;

a main oil feed for pressurizing the outboard side of the thrust collar after the axially slidable annular sealing ring is moved toward the thrust collar.

8. The improvement recited in claim 7 wherein the axially slidable sealing ring further includes hydrodynamic pockets whereby as the rotor speed increases the axial clearance between the sealing ring and the thrust runner increases.

9. A method of operating a compressor having a bearing housing including a thrust collar and a thrust bearing ring mounted on a rotor; said method comprising the steps of:

introducing high pressure pilot oil into the bearing housing to cause an axially slidable sealing ring to engage the thrust collar during periods of low rotor speed;

introducing high pressure main oil into the bearing housing to create a balancing force against the thrust collar after the sealing ring engages the thrust collar;

deleting the high pressure main oil and the pilot oil and introducing lower pressure lube oil into the bearing housing after the rotor has reached a normal operating speed.

10. The method recited in claim 9 wherein periods of low rotor speed operation include start-up and shutdown; and, wherein normal operating speed includes a continuous operating speed at useful compressor capacity.

11. A system for balancing thrust in a rotating shaft machine having an outer casing including a rotor supported therein; a thrust collar mounted on the rotor and at least one stationary thrust bearing ring on the outboard side of the thrust collar and axially adjacent thereto for limiting the axial movement of the rotor; and wherein the thrust balancing system comprises:

a bearing housing surrounding the thrust collar and the thrust bearing ring;

an axially slidable sealing ring disposed on the outboard side of the thrust collar and between the outer circumference of the thrust bearing ring and the inner surface of the bearing housing;

an annular pilot oil cavity between the thrust bearing ring outer circumference and the inner surface of the bearing housing; and, a main oil manifold having a discharge outlet radially inwardly of the thrust bearing ring outer circumference;

means for pressurizing the pilot oil cavity to move the sealing ring into contact with the thrust collar; and, means for pressurizing the main oil manifold on the side of the thrust collar containing the sealing ring.

12. The thrust balancing system recited in claim 11 wherein the axially slidable sealing ring further includes hydrodynamic pockets on the surface of the sealing ring facing the thrust bearing collar.

* * * * *